Figure 1:
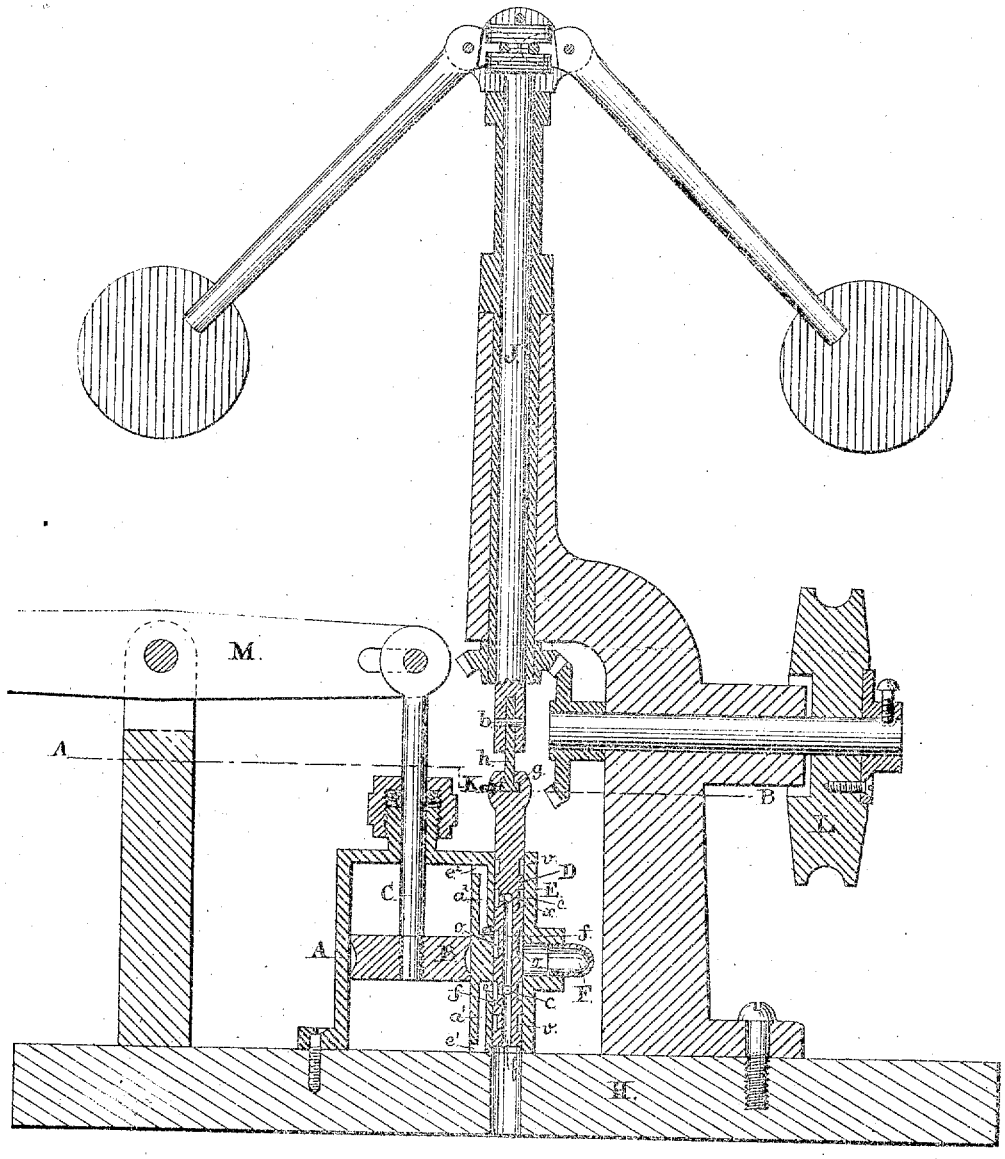

2 Sheets—Sheet 1.

A. LAWRENCE,

Assignor, by mesne assignments, to H. SNYDER.

Steam-Engine Governor.

No. 8,937. Reissued Oct. 21, 1879.

WITNESSES

R. H. Whittlesey

C. L. Parker

Alvin Lawrence

INVENTOR

Assignee

Henry Snyder by George H. Christy

ATTORNEY

2 Sheets—Sheet
A. LAWRENCE,
Assignor, by mesne assignments, to H. SNYDER
Steam-Engine Governor.
No. 8,937. Reissued Oct. 21, 1879.
FIG. II.
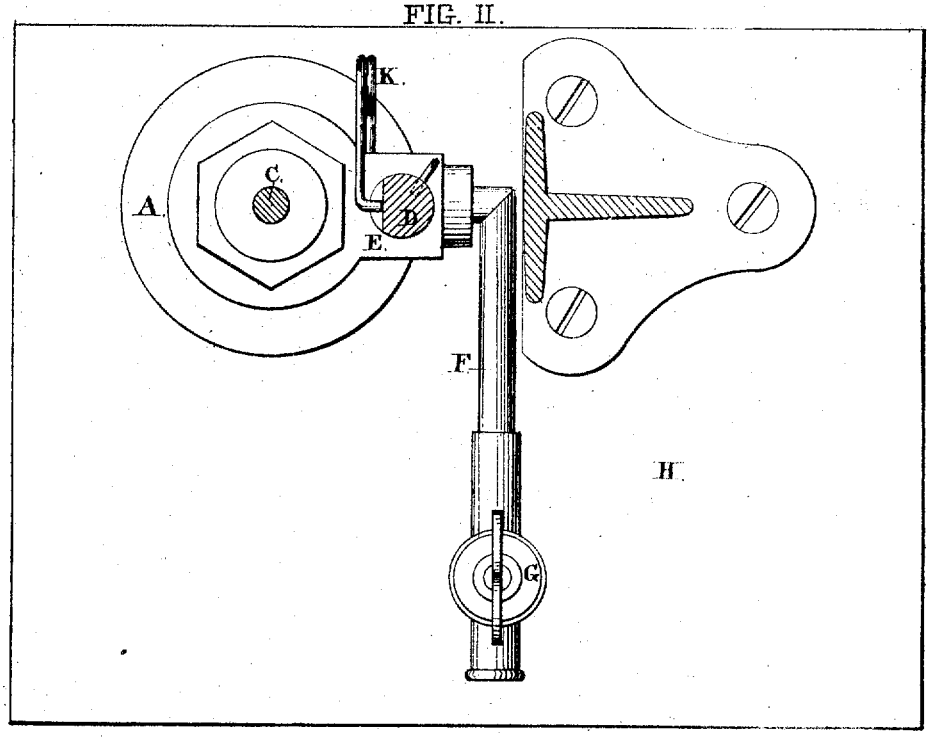
FIG. III.
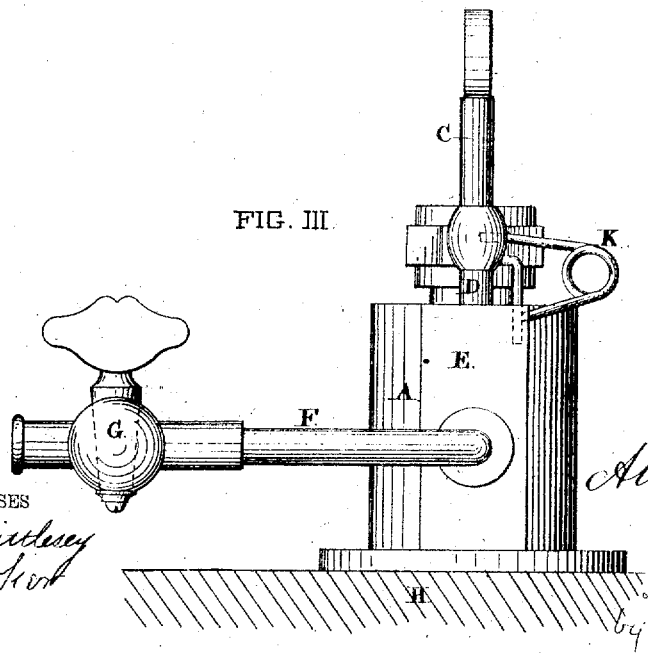
WITNESSES
R. H. Whitney
E. L. Parker
Alvin Lawrence
INVENTOR
Assignee,
Henry Snyder,
by George H. Christy
ATTORNEY

UNITED STATES PATENT OFFICE.

ALVIN LAWRENCE, OF LOWELL, MASSACHUSETTS, ASSIGNOR, BY MESNE ASSIGNMENTS, TO HENRY SNYDER, OF PHILADELPHIA, PENNSYLVANIA.

IMPROVEMENT IN STEAM-ENGINE GOVERNORS.

Specification forming part of Letters Patent No. 52,789, dated February 20, 1866; Reissue No. 8,937, dated October 21, 1879; application filed September 25, 1879.

*To all whom it may concern:*

Be it known that I, ALVIN LAWRENCE, of Lowell, in the county of Middlesex and State of Massachusetts, have invented a new and useful Improved Method of Operating the Throttle or Cut-Off Gear of Steam-Engines; and I do hereby declare that the following is a full and exact description of the same, reference being had to the accompanying drawings, making a part of this specification, in which—

Figure 1 is a vertical central section of my invention. Fig. 2 is a plan or top view on the line A B of Fig. 1. Fig. 3 is a back view of the cylinder, valve-stem, spring, and supply-pipe pertaining to the same.

My invention consists in combining and arranging a valve with a cylinder, or its equivalent, in such a manner that said valve may be operated by the governor, and the admission and exhaust ports opened and closed to admit the fluid under pressure into either end of the cylinder and exhaust the fluid out of either end of the same, as the action of the governor may determine.

My invention also consists in the arrangement of a spring secured to any suitable support, and so arranged as to engage with the valve stem or rod and restore said valve to its central position if, by reason of backlash or loss of motion in the working parts of the governor, said governor should fail to act in time. Said spring is intended to act a little in advance of the motion of the governor.

In the drawings, A is the cylinder, provided with a piston-head, B, and a piston-rod, C; also, a valve, D, arranged to operate within a valve-chest, E, which communicates with the cylinder A by ports $e'$ $e^2$ and passages $a'$ $a^2$. The groove $o$ in the substance of the valve D is for admission of fluid around the said valve to either of the ports $e'$ or $e^2$. The grooves $x$ $x$ provide for the exhaust of fluid which passes from the cylinder through ports $e'$ or $e^2$ and passages $a'$ or $a^2$ and openings $c$ $c$ and the center $f$ of the valve. The grooves $v$ $v$ are for packing, to prevent the escape of fluid around the top or bottom ends of the valve. A supply-pipe, F, enters the back side of the valve-chest E, and is provided with a cock, G, by which the quantity of fluid admitted to the cylinder may be regulated so as to move the piston fast or slow when the ports $e'$ or $e^2$ are opened to receive the said fluid.

The cylinder A may be fitted and secured to the bed-plate H, or a separate head may be secured to the lower end of the cylinder.

A ball-governor or other suitable device is secured to the bed-plate H, or otherwise conveniently arranged, and the spindle J of the governor connected with the stem of the valve D by a swivel, $h$, which rotates in a socket, $g$, made in the stem of the valve D to receive it. The top end of the swivel-rod enters the lower end of the spindle J of the governor, and is secured thereto by a pin, $b$.

A spring, K, secured at one end to the substance of the valve-chest E, and the other end engaged with the stem of the valve D, serves to restore said valve to its central position and perfectly close the ports at both ends of the cylinder before the balls of the governor have fully returned to their normal plane, regardless of backlash or loss of motion in the working parts of said governor, caused by wear or otherwise.

Motion may be imparted to the governor by a belt running from a pulley on the shaft of the engine to the pulley L of the governor, said pulleys being of proper diameters to correspond with the required speed of the engine.

The fluid used to operate the piston B may be water, oil, or the equivalent thereof, and the pressure may be that of the boiler which supplies steam for the engine, or it may be the pressure of a tank or reservoir or any other available pressure; and when my invention is applied to a steam-engine, substantially as herein shown and described, increased speed to rise and move the spindle J of the governor of the engine causes the balls of the governor and the valve D downward a sufficient distance to allow fluid to pass from the supply-pipe F around the groove $o$ of the valve D, through the ports $e'$ and passage $a'$, into the lower end of the cylinder A, forcing the piston upward to move the lever M, or any other device connected with the top of the piston-rod C, in one direction, said lever or other device to be connected with the throttle or cut-off gear of the engine; and when the speed of the engine is diminished, the balls of the governor fall, which raises the spindle J and the valve D, and admits fluid around the groove *o* of the valve D, through the ports $e^2$ and passages $a^2$, into the upper end of the cylinder A, forcing the piston downward and moving the lever M or other device in the opposite direction, thus operating the throttle or cut-off gear with great force and a steady motion.

When an engine having my invention connected as specified is running at its proper speed the balls of the governor revolve in their normal plane, and the valve D is in its central position, and both of the ports $e'$ and $e^2$ are closed, and no ordinary force can move the throttle or cut-off gear in either direction until the speed of the engine is changed.

In the ordinary process of operating the throttle or cut-off gear of steam-engines, the spindle of the governor is connected with the throttle or cut-off gear, and when the load upon the engine is increased the balls of the governor fall to open the throttle or adjust the cut-off gear and admit a greater volume of steam to the cylinder to drive the increased load, and when increased load is thrown upon the engine and the balls of the governor fall, as above stated, the speed of the engine is diminished in proportion to the load, for if the engine recovered its speed the balls of the governor would rise and close the throttle, and no greater volume of steam would be admitted to the cylinder with a heavy load than with a light load, and when a considerable portion of the load is thrown off from the engine the speed is increased and the balls of the governor rise and close the throttle or adjust the cut-off gear to admit a less volume of steam to the cylinder; and when said load is thrown off from the engine, and the balls of the governor rise, as hereinabove stated, the speed of the engine is increased in proportion, for if the engine returned to its speed the balls of the governor would fall and open the throttle or adjust the cut-off gear so as to admit the same volume of steam for a light load as for a heavy one. In either case, if the engine run at its proper speed, the balls of the governor will revolve in their normal plane, and increasing or diminishing the load upon the engine increases or diminishes the speed of the engine.

In the use of my invention to operate the throttle or cut-off gear of steam-engines, when the load upon the engine is increased or diminished the balls of the governor rise or fall, and thereby raise or lower the valve D, to open either of the ports $e'$ or $e^2$, as the case may be, and admit fluid into either end of the cylinder A, to force the piston upward or downward and open or close the throttle or adjust the cut-off gear, so as to admit a sufficient volume of steam to drive the said load and allow the engine to resume its proper speed, and when the throttle has been opened or closed or the cut-off gear adjusted, as above stated, and the engine attains its proper speed, the balls of the governor will resume their normal plane, operating the valve D and closing both of the ports $e'$ and $e^2$, leaving the throttle opened or closed, as the case may be, a sufficient distance, or the cut-off gear properly adjusted to admit the required volume of steam to drive the engine at its proper speed with the load increased or diminished.

When the pressure of steam in the boiler is diminished the speed of the engine is also diminished, and the balls of the governor fall, causing the throttle to open and admit a greater volume of steam to the cylinder of the engine, thus making up in volume what is lost in pressure, and when the pressure of steam in the boiler is increased the speed of the engine is also increased, and the balls of the governor rise, causing the throttle to close, thus decreasing in volume what is gained in pressure, and thereby maintaining uniform speed under varying loads and pressures, which is the object of this invention.

It will be observed that the efficiency of the valve D for the purposes and in the operation described depends, in large part, on the presence in it and in the cylinder A of a system of ports and passages suitably arranged for admitting fluid-pressure to one side of the moving piston or the other, and also for simultaneously exhausting fluid-pressure from the opposite side. Thus the ports and passages described constitute, in effect and function, two supply and two exhaust ports.

What I claim as new, and desire to secure by Letters Patent, is—

1. The combination of a governor, a valve, D, operated by such governor, a cylinder, A, for receiving and by suitable means, as described, transmitting the force of fluid-pressure to a throttle or cut-off gear connection, substantially as set forth.

2. As a means for applying fluid under pressure for operating the throttles, valves, or cut-off gear of steam-engines, the combination of a cylinder, A, a valve-chest, E, a governor, and a valve, D, connected with and operated by said governor, substantially as set forth.

3. In combination with a revolving governor and a valve, D, connected with and operated by said governor, a spring, K, arranged and combined substantially as set forth.

4. The supply-pipe F and cock G, in combination with the cylinder A, valve-chest E, valve D, and a governor connected with and operating said valve, substantially as set forth.

5. A regulating device for steam-engines, in which are combined the following elements, namely: a cylinder, A, closed at both ends and having a piston the rod of which is connected with a throttle-moving device, a system of ports and passages for admitting fluid-pressure to and exhausting it from the ends of the cylinder on opposite sides of the piston, and a centrifugal governor arranged to open and close such ports and passages, substantially as set forth.

6. The method of actuating the throttle or cut-off gear of a steam-engine by means of a piston under fluid-pressure, such pressure being regulated by the varying speed of a revolving governor, substantially as set forth.

7. A speed-regulator consisting of the combination of a governor, a valve operated thereby and regulating the supply of fluid-pressure to a cylinder having a piston, and a throttle or cut-off gear connection from such piston, substantially as described.

8. A piston moved by a fluid under pressure to control the throttle or cut-off mechanism, in combination with a valve to regulate such fluid-pressure and a governor to communicate motion to the valve, substantially as set forth.

In testimony whereof I have hereunto set my hand.

ALVIN LAWRENCE.

Witnesses:
FRANK O. BUTTERFIELD,
ABBOTT LAURENCE.